US006885744B2

(12) United States Patent
Bluestein et al.

(10) Patent No.: US 6,885,744 B2
(45) Date of Patent: Apr. 26, 2005

(54) METHOD OF PROVIDING BACKGROUND AND VIDEO PATTERNS

(75) Inventors: Jared Bluestein, Wilmot, NH (US); Anthony Dezonno, Bloomingdale, IL (US); Mark J. Power, Carol Stream, IL (US); Kenneth Venner, Las Flores, CA (US); James F. Martin, Woodside, CA (US); Darryl Hymel, Batavia, IL (US); Craig R. Shambaugh, Wheaton, IL (US); Laird C. Williams, Raleigh, NC (US)

(73) Assignee: Rockwell Electronic Commerce Technologies, LLC, Wood Dale, IL (US)

(*) Notice: Subject to any disclaimer, the term of this patent is extended or adjusted under 35 U.S.C. 154(b) by 464 days.

(21) Appl. No.: 10/027,197

(22) Filed: Dec. 20, 2001

(65) Prior Publication Data

US 2003/0118173 A1 Jun. 26, 2003

(51) Int. Cl.[7] .............................................. H04M 3/00
(52) U.S. Cl. ............................. 379/265.09; 379/88.17; 379/265.02
(58) Field of Search ....................... 379/265.02, 265.09, 379/266.01, 266.02, 309, 88.17, 900

(56) References Cited

U.S. PATENT DOCUMENTS

| 4,771,671 | A | | 9/1988 | Hoff, Jr. |
| 5,017,143 | A | | 5/1991 | Backus et al. |
| 5,060,085 | A | | 10/1991 | Gelbwachs |
| 5,083,924 | A | | 1/1992 | Cochran et al. |
| 5,307,051 | A | | 4/1994 | Sedlmayr |
| 5,621,868 | A | | 4/1997 | Mizutani et al. |
| 5,649,057 | A | | 7/1997 | Lee et al. |
| 5,683,253 | A | | 11/1997 | Park et al. |
| 5,844,565 | A | | 12/1998 | Mizutani et al. |
| 5,956,459 | A | | 9/1999 | Kato et al. |
| 5,978,467 | A | * | 11/1999 | Walker et al. ......... 379/266.01 |
| 6,014,439 | A | * | 1/2000 | Walker et al. ......... 379/266.01 |
| 6,099,320 | A | | 8/2000 | Papadopoulos |
| 6,130,933 | A | * | 10/2000 | Miloslavsky ............. 379/90.01 |
| 6,139,329 | A | | 10/2000 | Mino et al. |
| 6,141,413 | A | * | 10/2000 | Waldner et al. .......... 379/88.17 |
| 6,230,287 | B1 | * | 5/2001 | Pinard et al. .................. 714/31 |
| 6,377,944 | B1 | * | 4/2002 | Busey et al. .................... 707/3 |
| 6,389,132 | B1 | * | 5/2002 | Price ...................... 379/265.01 |
| 6,400,804 | B1 | * | 6/2002 | Bilder ......................... 379/76 |
| 6,438,599 | B1 | * | 8/2002 | Chack ......................... 709/229 |
| 6,449,356 | B1 | * | 9/2002 | Dezonno ............... 379/265.01 |
| 6,584,193 | B1 | * | 6/2003 | Petrunka ................ 379/266.01 |
| 6,668,286 | B1 | * | 12/2003 | Bateman et al. ................ 710/6 |

FOREIGN PATENT DOCUMENTS

WO   WO00/46789   8/2000

* cited by examiner

*Primary Examiner*—Bing Q. Bui
(74) *Attorney, Agent, or Firm*—Welsh & Katz, Ltd.

(57) ABSTRACT

A method and apparatus are provided for presenting background sensory information to a call participant through a call connection. The method includes the steps of determining an identity of the call participant from call associated information and presenting the call participant with predetermined background sensory information through the call connection based upon the identity of the caller.

42 Claims, 1 Drawing Sheet

METHOD OF PROVIDING BACKGROUND AND VIDEO PATTERNS

FIELD OF THE INVENTION

The invention relates to communication systems and more particularly to automatic call distributors.

BACKGROUND OF THE INVENTION

Automatic call distributors (ACDs) are generally known. Such devices are typically used wherever a large number of calls must be handled for some common enterprise. Typically the calls of the enterprise are routed through the ACD as a means of processing the calls under a predetermined format.

For example, an organization may disseminate a limited number of telephone numbers as a means of contacting the organization. Each telephone number may be directed to a specific department or division of the organization. A group of agents may be provided and trained specifically for the needs of the department of division.

As calls arrive, the ACD may first detect a dialed number of a specific department or division and then search for an agent trained to handle the call. The dialed number may be received from the public switched telephone network (PSTN) using such features as dialed number identification service (DNIS). Using DNIS, the ACD may identify an intended destination of the call and, as a consequence, an agent group trained to handle the call.

Once an intended destination is determined, the ACD may proceed to identify agents capable of handling the call. In order to identify agents, the ACD may monitor a status of each agent's telephone. If the telephone is on-hook, the agent may be regarded as available to receive the call. If the agent's telephone is off-hook, the agent may be regarded as not available. Where more than one agent is available, the ACD may select the agent whose telephone has been on-hook the longest period.

In order to leverage agent performance, each agent may be provided with a computer terminal connected to a customer database. As calls are received, the caller may be identified to the database by information received from the PSTN using automatic number identification (ANI).

Further, as an agent is selected to receive a call, the identifier of the caller and selected agent may be transferred to the customer database. Using the customer and agent identifiers, the database may automatically recover and display customer records on the computer terminal of the selected agent as a screen pop at the same instant that the call is delivered to the agent telephone from the ACD.

While call handling through ACDs works well, agents are not always available to handle the volume of incoming calls. Customers are often placed in call queues pending agent availability or placed on hold while an agent searches for additional information. Because of the importance of optimizing the use of a call connection, a need exists for a way of delivering targeted information to customers.

SUMMARY

A method and apparatus are provided for presenting background sensory information to a call participant through a call connection. The method includes the steps of determining an identity of the call participant from call associated information and presenting the call participant with predetermined background sensory information through the call connection based upon the identity of the caller.

DETAILED DESCRIPTION OF A PREFERRED EMBODIMENT

Figure 1:
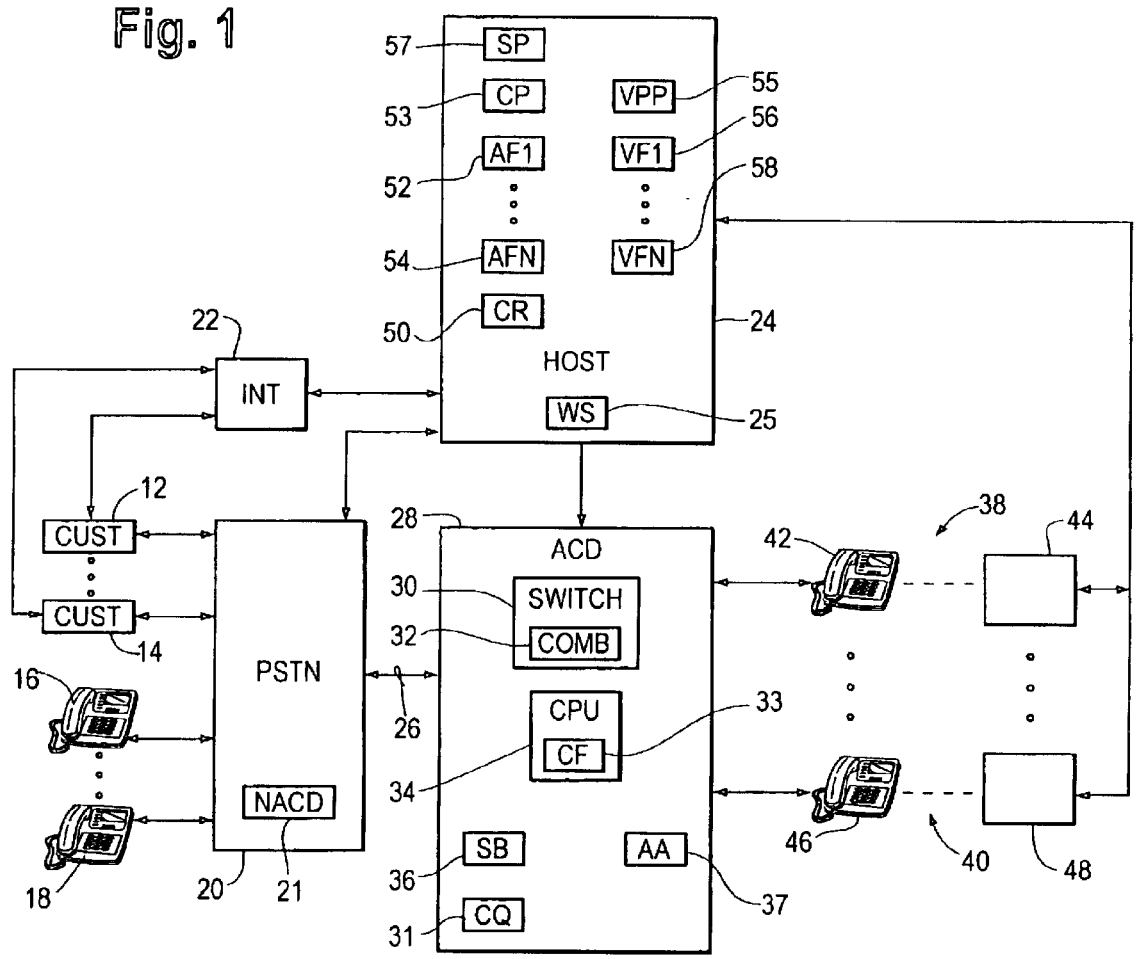
FIG. 1 is a block diagram of a call processing system under an illustrated embodiment of the invention.

FIG. 1 is a block diagram of a call processing system 10 shown generally in a context of use and in accordance with an illustrated embodiment of the invention. Under the illustrated embodiment, calls may be received from, or placed to, customers 12, 14, 16, 18 under any of a number of different formats. For example, voice calls may be processed through the PSTN 20 using a conventional audio channel or routed through the Internet 22 under a voice-over-IP (VoIP) format. Alternatively, a call may simply be a customer 12, 14 accessing a web site 25 of the call processing center 10 through the Internet 22.

In any case, the call center 10 may function to identify the caller. Upon identifying the caller, a host 24 of the call processing system 10 may retrieve and automatically present a stream of audio and/or video sensory information to the caller in a manner appropriate to the situation.

The content of the stream of sensory information may be selected based upon the objectives of the organization operating the call processing system 10. For example, if the organization is a merchant, then the content may be selected based upon the identity of the customer and the customer's past purchasing activity. If the organization is a political party, the content may be a political message tailored to the person involved.

Turning first to FIG. 1, an description will be provided of the mechanisms of customer interaction with the call processing system 10. Following an description of the interaction, an explanation will be provided of how that interaction may be used to present targeted sensory information to that customer during the interaction in furtherance of the organizational objectives of the user of the call processing system 10.

The call processing center 10 may include an ACD 28, a host 24 and a number of agents, each working though an agent station 38, 40. Each agent station 38, 40 may include a conventional telephone console 42, 46 and a computer terminal 44, 48.

The host 24 may include a web site 25 and a data base of customer records 50. As the agents converse with customers 12, 14, 16, 18, the agents may access and modify a customer's records 50 through an associated terminal 44, 48.

In the case of voice calls, a caller (e.g., a customer using a convention telephone) 16, 18 may place a call to the call processing system 10. The PSTN 20 may route the call to the call processing system 10 along with certain types of call associated information. Call associated information may include DNIS information including a telephone number dialed by the caller and ANI information including the caller's identity. DNIS and ANI are both services provided by the PSTN 20.

Outbound calls may be initiated by the call processing system 10. A list of contacts (and contact information) may be maintained within the host 24. The host 24 may transfer telephone numbers to the ACD 28 at a rate intended to partially or fully occupy a staff of agents 38, 40. Call associated information, in this case, may simply be the contact information maintained within contact files located within the host 24.

Upon arrival at the ACD 28, the call may be detected at a port of a matrix switch 30. In the case of inbound calls, call associated information may be delivered from the PSTN 20 to a CPU 34. As a preliminary step, the CPU 34 may create a call record 33 to track the call. The call record may include the call associated information delivered along with the call.

The CPU 34 may send a copy of the call record 33 to the host 24. The host 24 functioning as a connection analyzer may access the customer's records 50 using the identifier of the customer from the call associated information and retrieve caller preferences (favorite agent, frequency purchased products, most recently purchased product, etc.). The host 24 may append a list of customer preferences to the call record 33 and send the record 33 back to the CPU 34 of the ACD 28.

Based upon the contents of the call file 33, the CPU 34 may select an agent to handle the call. Upon selection of an agent, the CPU 34 may notify the host 24 of the identity of the agent selected. In response, the host 24 may transmit the customer records to the selected agent. The customer records from the host 24 may appear as a screen pop on the terminal 44, 48 of the agent at the instant the call arrives.

Alternatively, if an agent is not available, the call may placed in a call queue or be routed by the CPU 34 to an auto-attendant 37. The auto-attendant 37 may orally provide the caller with a series of menu options. The caller may choose options by activating touch-tone keys on his telephone. The auto-attendant 37 may decode any detected touch-tones and add the customer information to the call file 33 as additional call associated information used to further improve routing efficiency of the call.

As an alternative to a telephone call delivered through the PSTN 20, a caller 12, 14 may access of the web site 25 through the Internet 22. To access the web site 25, the customer 12, 14 may enter a universal resource locator (URL) of the web site 25 into his browser and transmit an access request packet to the web site 25.

Within the host 24, the packet arriving from the customer 12, 14 may be decoded both to deliver the packet to the web site 25 and also to recover the URL of the sender 12, 14. The host 24 again functioning as a connection analyzer may access the customer record file 50 and identify the caller 12, 14 using the caller's URL. Upon identifying the caller, 12, 14, the host 24 may retrieve the customer's preferences and a most recent buying records.

The host 24 may also create a call file to track the call. The call file may include the URL or some other identifier of the caller, an identifier of the web site 25 and any web page visited. Information entered by the caller into any interactive windows on a web page may also be stored within the call file.

As with voice calls, information collected and entered into the call file, without the participation of an agent, becomes call associated information. In general, and as used herein, call associated information may mean a URL of the caller, ANI or DNIS information or any other information given by the call participant through the call connection without participation of an agent either orally or manually using a keypad, mouse, softkeys or keyboard.

Figure 2:
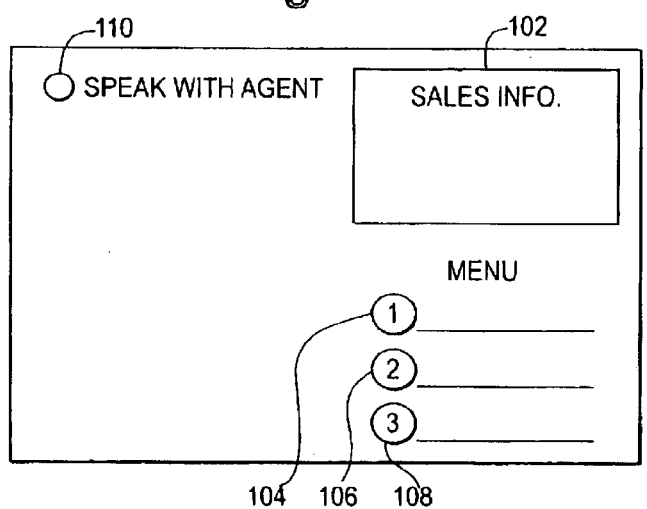
FIG. 2 is a web page that may be provided by the system of FIG. 1.

Upon decoding of the packet, the web site 25 may return a web page 100 (FIG. 2) to the caller 12, 14. Included within the web page 100 may be sales information 102, menu selections 104, 106, 108 to obtain further information and also a softkey 110 for voice access to an agent 38, 40 in the event the caller wishes to place an order or to ask a question.

If the caller 12, 14 should activate the softkey 110 requesting access to an agent, then the host 24 may send an agent request (including the call file) to the ACD 28. The agent request may include a subject matter of the web page 100 as well as customer preferences.

Upon receiving the agent request, the CPU 34 of the ACD 28 may first determine which agents are available and then which of the available agents is best suited to answer the call. The CPU 34 may determine which agents are available to receive a call by identifying any agents whose telephone 42, 46 is on-hook.

In addition, the CPU 34 may access an agent training list to determine which, if any, agent is qualified to answer a question regarding the web page from which the request originated. If an agent is identified, the CPU 34 transfers an identifier of the selected agent to the host 24. The CPU 34 may also mark the selected agent as occupied to avoid assigning any further calls to the selected agent until the current call is complete.

Upon receiving the identifier of the selected agent, the host 24 may transfer the URL of the caller 12, 14 to the selected agent along with instructions to activate a VoIP application within the agent's terminal 44, 48. The host 24 may also transfer any customer records 50 to the terminal of the selected agent for display during call set-up.

In order to enhance the value of customer contacts, the call processing system 10 may function to deliver a stream of targeted sensory information to the caller. Delivery of the background sensory information may occur in either an active or passive manner. As used herein, the difference between active and passive has to do with whether or not the caller is actively engaged in exchanging information with an agent.

Further, even when a caller is actively engaged with an agent, sensory information may still be provided as background information. As used herein, background sensory information means audio and/or video information that is subordinate to, or suppressed by, information presented or requested through the call connection by a human participant, but only for the duration of the presentation by or to the human participant. For example, in the case of background audio information, the background audio information would be suspended (or the volume reduced to an inaudible level) when the human participant begins to speak. If the human participant should pause for some predetermined time period (e.g., greater than 1 second), then the background audio information may resume.

In the case of a video display (e.g., a web page display), the video information provided or requested by a human participant remains available on the screen until replaced by information from the same or another human participant. After the predetermined time period, the information provided or requested by the human participant may be replaced by background video information. Any subsequent activity by a human participant would cause the background video information to disappear and the foreground information provided or requested by the human to reappear.

Alternatively, static or streaming background video information may appear around the margins of the information provided or requested by the human participant. Again, any subsequent activity by a human participant would cause the background video information to disappear.

As a further alternative, background video information may be presented as moving ghost images passing through a field of view on the screen of the human participant. As used herein, a ghost image may be visual information with a lower level of contrast than participant information. Where the background video information is presented as ghost images, the presentation may be continuous or intermittent based upon detected human activity through the keyboard.

In the case of voice calls through the ACD 28, the call processing system 10 may deliver background information passively by detecting the occurrence of a call being placed in a call queue pending agent availability. Alternatively, if the caller is placed on hold be an agent, the system 10 may also passively deliver targeted sensory information.

As used herein, targeted sensory information means information specifically selected for the specific customer and possibly the specific type of customer involved. The identity of the customer may be determined upon call arrival from the URL or ANI information. A customer type may be determined from the call associated information of the call file.

From the customer identity and type, a file of sensory information may be retrieved and presented to the call connection. In the case of a call received through the PSTN 20 and ACD 28, the CPU 34 may track the status of the call. In the case where sensory information is presented in the inactive status, the CPU 34 may function to detect a call being placed in a queue or placed on hold. In either case, the CPU 34 may send notice to the host 24 of the transition along with a call identifier.

Upon receipt of the notice and call identifier, the host 24 may search for and select an audio file 52, 54 or audio-video file 56, 58. In the case of an existing customer, the host 24 may use the customer identifier to retrieve a customer's records 50. From the records, the host 24 may identify a pattern of purchases or a most recent purchase. Based upon the purchase records, the host 24 may select a file 52, 54, 56, 58 reciting promotional information related to items found within those purchase records.

Further, selection of the file 52, 54, 56, 58 may be based upon any of a number of different criteria. While promotional information may be one option, it is certainly not the only option. For example, a customer that is known to be quite excitable may be presented with calming music while on hold. An organization selling recorded music, may present recent recordings (or videos) of artists previously chosen by the caller.

Further, even where the host 24 recognizes from the identity that the caller is a new customer, the host 24 may select a file based upon that a most popular product. If the caller has been placed on hold by an agent, any notes taken by the agent and entered into a new customer record 50 may be used for selection of files 52, 54, 56, 58.

Color may be used for calls through the web site 25. Red and yellow are known to enhance an inclination to buy. Color may be used for each caller or the color may be tailored to the caller.

Further, the introduction of the sensory information under the active format may adapted to the medium of the call. Noise canceling microphones may be used to remove noise in the environment of the agent 38, 40. Once the noise has been cancelled, the appropriate background sensory information may be combined with an audio signal from the agent 38, 40 using a combiner 32 within the switch 30 or a voice packet processor 54 within the host 24. The combiner 32 may function using call conferencing features or under any of a number of other algorithms (e.g., mixing algorithm, loudest speaker algorithm, last speaker algorithm, etc.).

In the case of video information displayed through the web site 25, a communication processor 53 may receive the selected sensory information under an html format from the selected file 56, 58. The communication processor 53 may periodically forward the selected html information to the URL of the caller as described above.

Alternatively, a blue screen approach may be used. Under the blue screen approach, pixel information on a screen background may be set to a blue color. Information from the agent may be colored black. Sensory information may be a grey scale or another color. A substitution processor 57 within the host 24 may periodically delete any screen information not in a blue or a black color and replace with updated background sensory information.

In another illustrated embodiment of the invention, a network ACD (NACD) 21 may be provided within the PSTN 20. The NACD 21 may be provided in place of the ACD 28 or as an adjunct to the ACD 28 during weekends or other periods when the ACD 28 is not staffed or is otherwise not available. In this case, callers may be identified as described above. Once identified, the host 24 may operate, substantially as described above, to select and present audio information to each caller.

A specific embodiment of a method and apparatus for presenting background sensory information has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of presenting background sensory information to a call participant through a call connection between the call participant and an automatic call processor, such method comprising the steps of:

determining an identity of the call participant from call associated information; and presenting the call participant with predetermined background sensory information through the call connection from the automatic call processor to the call participant based upon the identity of the call participant.

2. The method of presenting sensory information as in claim 1 further comprising retrieving the predetermined sensory information from a computer file of a database.

3. The method of presenting sensory information as in claim 1 wherein the step of determining the identity of the call participant further comprises receiving ANI information from the call connection.

4. The method of presenting sensory information as in claim 1 wherein the step of determining the identity of the call participant further comprises receiving a universal resource locator of the call participant from the call connection.

5. The method of presenting sensory information as in claim 1 wherein the step of receiving the universal resource locator of the call participant further comprises detecting an access request at a web site of the call processing system.

6. The method of presenting sensory information as in claim 5 wherein the step of detecting the access request at the web site of the call processing system further comprises downloading a web page to the call participant.

7. The method of presenting sensory information as in claim 6 wherein the step of downloading the web page to the call participant further comprises superimposing the background sensory information on the web page.

8. The method of presenting sensory information as in claim 1 wherein the step of presenting the sensory information to the call participant further comprises detecting the call participant being placed in a call queue.

9. The method of presenting sensory information as in claim 1 further comprising connecting the call participant with an agent of the automatic call processor.

10. The method of presenting sensory information as in claim 9 wherein the step of presenting the sensory information to the call participant further comprises detecting the agent placing the call participant on hold.

11. The method of presenting sensory information as in claim 1 wherein the step of presenting the sensory information to the call participant further comprises conferencing in the sensory information as background information during the call.

12. The method of presenting sensory information as in claim 1 wherein the step of presenting the sensory information further comprises canceling noise from a signal of a second party to the call connection.

13. The method of presenting sensory information as in claim 1 wherein the sensory information further comprises music.

14. The method of presenting sensory information as in claim 1 wherein the sensory information further comprises a commercial presentation.

15. The method of presenting sensory information as in claim 1 wherein the sensory information further comprises video.

16. The method of presenting sensory information as in claim 1 wherein the sensory information further comprises a commercial video presentation.

17. An apparatus for presenting background sensory information to a call participant through a call connection between the call participant and an automatic call processor, such apparatus comprising:
   means for determining an identity of the call participant from call associated information; and
   means for presenting the call participant with predetermined background sensory information through the call connection from the automatic call processor to the call participant based upon the identity of the call participant.

18. The apparatus for presenting sensory information as in claim 17 further comprising means for retrieving the predetermined sensory information from a computer file of a database.

19. The apparatus for presenting sensory information as in claim 17 wherein the means for determining the identity of the call participant further comprises means for receiving ANT information from the call connection.

20. The apparatus for presenting sensory information as in claim 17 wherein the means for determining the identity of the call participant further comprises means for receiving a universal resource locator of the call participant from the call connection.

21. The apparatus for presenting sensory information as in claim 17 wherein the means for receiving the universal resource locator of the call participant further comprises means for detecting an access request at a web site of the call processing system.

22. The apparatus for presenting sensory information as in claim 21 wherein the means for detecting the access request at the web site of the call processing system further comprises means for downloading a web page to the call participant.

23. The apparatus for presenting sensory information as in claim 22 wherein the means for downloading the web page to the call participant further comprises means for superimposing the background sensory information on the web page.

24. The apparatus for presenting sensory information as in claim 17 wherein the means for presenting the sensory information to the call participant further comprises means for detecting the call participant being placed in a call queue.

25. The apparatus for presenting sensory information as in claim 17 further comprising means for connecting the call participant with an agent of the automatic call processor.

26. The apparatus for presenting sensory information as in claim 25 wherein the means for presenting the sensory information to the call participant further comprises means for detecting the agent placing the call participant on hold.

27. The apparatus for presenting sensory information as in claim 17 wherein the means for presenting the sensory information to the call participant further comprises means for conferencing in the sensory information as background information during the call.

28. The apparatus for presenting sensory information as in claim 17 wherein the means for presenting the sensory information further comprises means for canceling noise from a signal of a second party to the call connection.

29. The apparatus for presenting sensory information as in claim 17 wherein the sensory information further comprises music.

30. The apparatus for presenting sensory information as in claim 17 wherein the sensory information further comprises a commercial presentation.

31. The apparatus for presenting sensory information as in claim 17 wherein the sensory information further comprises video.

32. The apparatus for presenting sensory information as in claim 17 wherein the sensory information further comprises a commercial video presentation.

33. An apparatus for presenting background sensory information to a call participant through a call connection between the call participant and an automatic call processor, such apparatus comprising:
   a connection analyzer adapted to determine an identity of the call participant from call associated information; and
   a communication processor adapted to present the call participant with predetermined background sensory information through the call connection from the automatic call processor to the call participant based upon the identity of the call participant.

34. The apparatus for presenting sensory information as in claim 33 further comprising a database adapted to store sensory information.

35. The apparatus for presenting sensory information as in claim 33 wherein the connection analyzer further comprises an automatic call distributor adapted to receive ANI information from the call connection.

36. The apparatus for presenting sensory information as in claim 33 wherein the connection analyzer further comprises a host adapted to receive a universal resource locator of the call participant from the call connection.

37. The apparatus for presenting sensory information as in claim 36 wherein the host further comprises a web site.

38. The apparatus for presenting sensory information as in claim 33 wherein the communication processor further comprises a noise canceling microphone.

39. The apparatus for presenting sensory information as in claim 33 wherein the sensory information further comprises music.

40. The apparatus for presenting sensory information as in claim 33 wherein the sensory information further comprises a commercial presentation.

41. The apparatus for presenting sensory information as in claim 33 wherein the sensory information further comprises video.

42. The apparatus for presenting sensory information as in claim 33 wherein the sensory information further comprises a commercial video presentation.

* * * * *